United States Patent
Yang et al.

(10) Patent No.: US 10,367,201 B2
(45) Date of Patent: Jul. 30, 2019

(54) NEGATIVE ELECTRODE INCLUDING A POLYMERIC SINGLE-ION CONDUCTOR COATING

(71) Applicant: GM GLOBAL TECHNOLOGY OPERATIONS LLC, Detroit, MI (US)

(72) Inventors: Li Yang, Troy, MI (US); Mei Cai, Bloomfield Hills, MI (US); Qiangfeng Xiao, Troy, MI (US); Xiaosong Huang, Novi, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 15/085,510

(22) Filed: Mar. 30, 2016

(65) Prior Publication Data

US 2017/0288230 A1    Oct. 5, 2017

(51) Int. Cl.
*H01M 4/60*     (2006.01)
*H01M 10/0565*  (2010.01)
(Continued)

(52) U.S. Cl.
CPC ......... *H01M 4/604* (2013.01); *H01M 2/1673* (2013.01); *H01M 4/0402* (2013.01); *H01M 4/0407* (2013.01); *H01M 4/134* (2013.01); *H01M 4/137* (2013.01); *H01M 4/1395* (2013.01); *H01M 4/1399* (2013.01); *H01M 4/366* (2013.01); *H01M 4/38* (2013.01); *H01M 4/381* (2013.01); *H01M 4/382* (2013.01); *H01M 10/058* (2013.01); *H01M 10/0565* (2013.01); *H01M 2004/027* (2013.01); *H01M 2220/20* (2013.01)

(58) Field of Classification Search
None
See application file for complete search history.

(56) References Cited

U.S. PATENT DOCUMENTS 7,902,299 B2    3/2011    Kerr et al.
8,974,946 B2    3/2015    Cai et al.
(Continued)

FOREIGN PATENT DOCUMENTS

| CN | 107275576 A | 10/2017 |
| DE | 102017106524 A1 | 10/2017 |
| WO | WO-2015026951 A1 | 2/2015 |

OTHER PUBLICATIONS

Cheng et al ("A Review of Solid Electrolyte Interphases on Lithium Metal Anode", Advanced Science, vol. 3, issue 3 (2016), p. 1-20—first published on Nov. 17, 2015).*

(Continued)

*Primary Examiner* — Sin J Lee
(74) *Attorney, Agent, or Firm* — Harness, Dickey & Pierce, P.L.C.

(57) ABSTRACT

A negative electrode includes a metal substrate and a polymeric single-ion conductor coating formed on a surface of the metal substrate. The metal substrate is selected from the group consisting of lithium, sodium, and zinc. The polymeric single-ion conductor coating is formed of i) a metal salt of a sulfonated tetrafluoroethylene-based fluoropolymer copolymer or ii) a polymeric metal salt having an initial polymeric backbone and pendent metal salt groups attached to the initial polymeric backbone.

18 Claims, 2 Drawing Sheets

(51) Int. Cl.
*H01M 10/058* (2010.01)
*H01M 4/04* (2006.01)
*H01M 4/137* (2010.01)
*H01M 4/1399* (2010.01)
*H01M 4/36* (2006.01)
*H01M 4/38* (2006.01)
*H01M 2/16* (2006.01)
*H01M 4/134* (2010.01)
*H01M 4/1395* (2010.01)
*H01M 4/02* (2006.01)

(56) References Cited

U.S. PATENT DOCUMENTS

| | | | |
|---|---|---|---|
| 9,123,939 B2 | 9/2015 | Xiao et al. | |
| 9,160,036 B2 | 10/2015 | Yang et al. | |
| 9,302,914 B2 | 4/2016 | Liu et al. | |
| 9,437,871 B2 | 9/2016 | Zhou et al. | |
| 9,537,144 B2 | 1/2017 | Huang et al. | |
| 9,647,254 B2 | 5/2017 | Dadheech et al. | |
| 2006/0041075 A1* | 2/2006 | Kerr | C08G 65/14 525/242 |
| 2015/0056507 A1 | 2/2015 | Dadheech et al. | |
| 2015/0236324 A1 | 8/2015 | Xiao et al. | |
| 2015/0349307 A1 | 12/2015 | Dadheech et al. | |
| 2016/0020491 A1 | 1/2016 | Dai et al. | |
| 2016/0111721 A1 | 4/2016 | Xiao et al. | |
| 2016/0141598 A1 | 5/2016 | Dai et al. | |
| 2016/0172681 A1 | 6/2016 | Yang et al. | |
| 2016/0172706 A1 | 6/2016 | Xiao et al. | |
| 2016/0172710 A1 | 6/2016 | Liu et al. | |
| 2016/0190641 A1* | 6/2016 | Lee | H01M 10/0565 429/303 |
| 2016/0218342 A1 | 7/2016 | Xiao et al. | |
| 2016/0372743 A1* | 12/2016 | Cho | H01M 4/382 |
| 2017/0214079 A1 | 7/2017 | Dai et al. | |

OTHER PUBLICATIONS

Driscoll, et al.; "Polyelectrolyte Membranes Containing Lithium Malonato(difluoro) borate for Lithium Ion Systems"; ECS Transactions; vol. 33 (23); 2011; pp. 33-53.

Gervais, et al.; "Ionomers with Highly Fluorinated Side Chains for Use in Battery and Fuel Cell Applications" ECS Transactions; vol. 33 (1); 2010 pp. 683-691.

Yang, et al.; "Six-Membered-Ring Malonatoborate-Based Lithium Salts as Electrolytes for Lithium Ion Batteries"; ECS Transactions; vol. 33 (39); 2011; pp. 57-69.

\* cited by examiner

NEGATIVE ELECTRODE INCLUDING A POLYMERIC SINGLE-ION CONDUCTOR COATING

TECHNICAL FIELD

The present disclosure is related to a negative electrode including a polymeric single-ion conductor coating.

BACKGROUND

Secondary, or rechargeable, metal-ion batteries are often used in many stationary and portable devices, such as those encountered in the consumer electronic, automobile/automotive, medical equipment, machinery, robotic, and aerospace industries. Examples of secondary, or rechargeable, metal-ion batteries include lithium-based batteries, sodium-based batteries, and zinc-based batteries. In the automotive industry, metal-ion batteries may be suitable for electric-based vehicles, such as hybrid electric vehicles (HEV), battery electric vehicles (BEV), plug-in HEVs, and extended-range electric vehicles (EREV). The lithium class of batteries has gained popularity for various reasons including a relatively high energy density, high power capability, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

A negative electrode includes a metal substrate and a polymeric single-ion conductor coating formed on a surface of the metal substrate. The metal substrate is selected from the group consisting of lithium, sodium, and zinc. The polymeric single-ion conductor coating is formed of i) a metal salt of a sulfonated tetrafluoroethylene-based fluoropolymer copolymer or ii) a polymeric metal salt having an initial polymeric backbone and pendent metal salt groups attached to the initial polymeric backbone.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium, sodium, and zinc are all suitable negative electrode materials, in part because of their respective high specific capacities (e.g., lithium has ~3860 mAh/g, Na has 1165 mAh/g, and Zn has 820 mAh/g). Each of these materials, however, tends to form dendrites during cell cycling. Dendrites are thin conductive filaments that can short the cell, reduce the cell's abuse tolerance, and reduce the overall life of the cell.

In the examples disclosed herein, dendrite growth is suppressed by forming a substantially homogeneous distribution of lithium, sodium, or zinc cations across the surface of, respectively, a lithium, sodium, or zinc metal substrate. A polymeric single-ion (Li$^+$, Na$^+$, or Zn$^+$) conductor is formed as a coating on the metal substrate. The polymeric single-ion conductor is formed of i) a metal salt of a sulfonated tetrafluoroethylene-based fluoropolymer copolymer or ii) a polymeric metal salt having an initial polymeric backbone and pendent metal salt groups attached to the initial polymeric backbone. In the example of the sulfonated tetrafluoroethylene-based fluoropolymer copolymer, the metal salt forms at the end of each pendent group. In the example of the polymeric metal salt, the metal salt group is attached to particular positions along the polymer backbone. The coating of the polymeric single-ion conductor on the metal substrate positions the cations-polyanions of the metal salt group relatively evenly across the metal substrate.

The relatively/substantially evenly distributed cations enable the current to be distributed relatively/substantially evenly during cell cycling. It has been found that when the current is distributed relatively/substantially evenly using the example polymeric single-ion (Li$^+$, Na$^+$, or Zn$^+$) conductors disclosed herein, dendrite growth can be suppressed.

Figure 1:
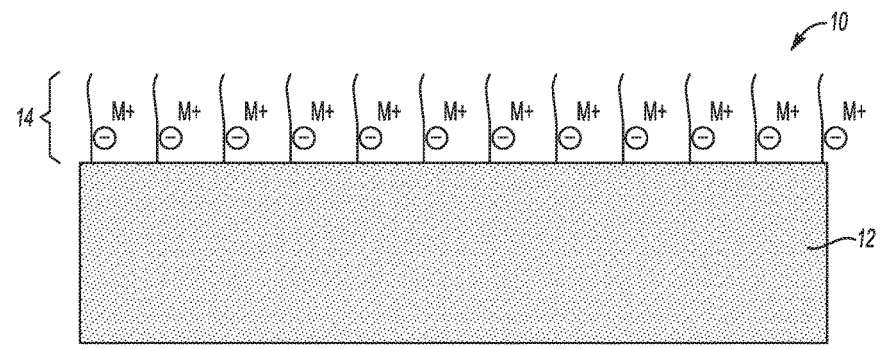
FIG. 1 is a schematic illustration of an example of the negative electrode disclosed herein.

Referring now to FIG. 1, the negative electrode 10 is depicted. As mentioned above, examples of the negative electrode 10 disclosed herein include a metal substrate 12 and an example of the single-ion conductor coating 14 formed on a surface of the metal substrate 12.

The metal substrate 12 may be lithium (e.g., lithium foil), sodium (e.g., sodium foil), or zinc (zinc foil).

The single-ion conductor coating 14 is formed of i) a metal salt of a sulfonated tetrafluoroethylene-based fluoropolymer copolymer or ii) a polymeric metal salt having an initial polymeric backbone and pendent metal salt groups attached to the initial polymeric backbone.

The metal salt of the sulfonated tetrafluoroethylene-based fluoropolymer copolymer may be a lithium, sodium, or zinc salt of the commercially available sulfonated tetrafluoroethylene-based fluoropolymer copolymer NAFION® (available from Du Pont). In an example, the metal salt of the sulfonated tetrafluoroethylene-based fluoropolymer copolymer may be synthesized by first copolymerizing tetrafluoroethylene (TFE) and a derivative of a perfluoro (alkyl vinyl ether) with sulfonyl acid fluoride (e.g., perfluoro (-3,6-dioxa-4-methyl-7-octene)sulfonylfluoride). These monomers may be co-polymerized via in-solution radical co-polymerization, or without solvent, or by emulsion polymerization in water. An initiator may be used. The sulfonylfluoride groups of the initial copolymer (1, see the scheme below) may be converted to sulfonic acid groups through hydrolysis. The final copolymer (2) may then be exposed to lithium hydroxide (LiOH), sodium hydroxide (NaOH), or zinc hydroxide (Zn(OH)$_2$) to form the metal salt version of the copolymer. An example of the formation of the lithium salt of the sulfonated tetrafluoroethylene-based fluoropolymer copolymer is shown below in scheme 1:

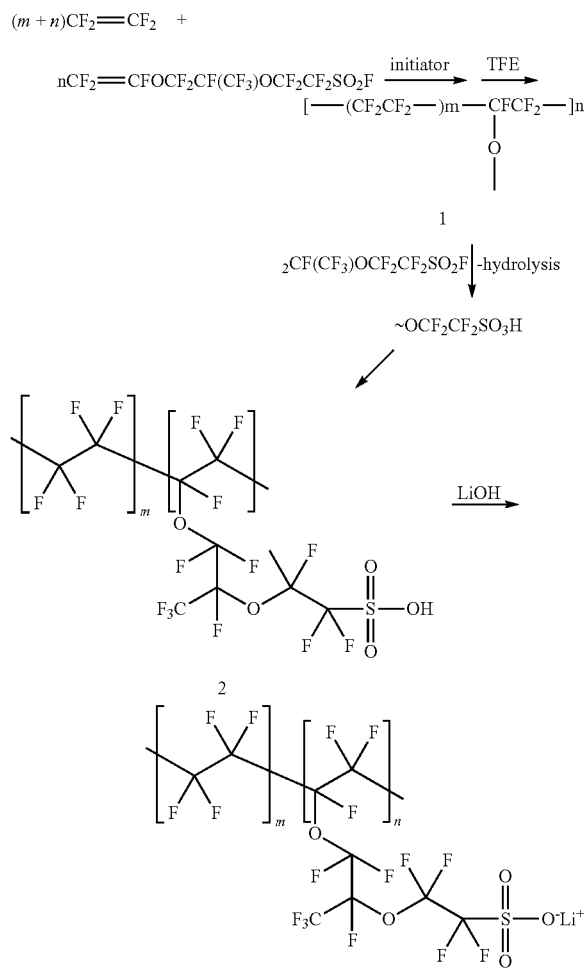

The polymeric metal salt having the initial polymeric backbone and pendent metal salt groups attached to the initial polymeric backbone. Examples of the initial polymeric backbone include polyolefins (e.g., polyethylene, polypropylene, etc.), polyvinylidene fluoride, polysulfone, polyethylene oxide, polyacrylate, polysiloxane, poly(vinyl acetate), polyimide, and co-polymers thereof.

Examples of the pendent metal salt groups may be lithium salts, sodium salts, or zinc salts, depending, in part, on the metal that is used for the metal substrate 12. The pendent metal salt groups may be metal salt analogs, such as allyl fluorinated metal salts. The pendent metal salt groups may be considered short, depending upon the length of the allyl group that is attached thereto. Examples of (modified) lithium salts include lithium bis(trifluoromethane)sulfonimide (LiTFSI), lithium malonatodifluoroborate, lithium sulfonate, lithium triflate, analogs thereof, and combinations thereof. For example, lithium sulfonimide is an analog of LiTFSI and

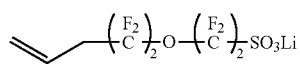

is an analog of lithium triflate. Examples of (modified) sodium salts include sodium trifluoromethanesulfonate, $NaClO_4$, $NaPF_6$, $NaBF_4$, NaTFSI (sodium(I) Bis(trifluoromethanesulfonyl)imide), NaFSI (sodium(I) Bis(fluorosulfonyl)imide), analogs thereof, and combinations thereof. Examples of (modified) zinc salts include zinc trifluoromethanesulfonate, $Zn(ClO_4)_2$, $Zn(PF_6)_2$, $Zn(BF_4)_2$, $Zn(TFSI)_2$, (zinc(II) Bis(trifluoromethanesulfonyl)imide), $Zn(FSI)_2$(zinc(II) Bis(fluorosulfonyl)imide), analogs thereof, and combinations thereof.

The (modified) metal salt groups may also include a linking group or chain that is capable of attaching to one end of the metal salt and is also cable of linking to the initial polymeric backbone. As an example, the linking group or chain may be a hydrosilyl linking chain. Alternatively, the metal salt groups may not include a linking group or chain, but rather may be attached to the initial polymeric backbone by a double bond reaction in the presence of an initiator.

The polymeric metal salt may be formed by tethering the anion carrying portion of the metal salt to the initial polymeric backbone. A chemical reaction may tether the metal salt to the initial polymeric backbone, and the chemical reaction that takes place will depend upon the metal salt and the initial polymeric backbone that are used. In an example, equal amounts of the salt and the polymer (or a pre-polymer that will form the polymer) may be dissolved in a suitable solvent in the presence of a catalyst and/or a cross-linking agent. The catalyst may be used to accelerate the reaction, and a cross-linking agent may be used to cross-link the polymeric backbone chains to achieve better mechanic performance. As examples, the solvent may be tetrahydrofuran (THF) and the catalyst may be platinum-divinyltetramethyldisiloxane. Other suitable solvents may include toluene, diethyl ether (DEE), etc. Any Pt catalyst can be utilized. The solution may be refluxed or exposed to other suitable conditions in which the reaction can take place. As a result of the reaction, a coating composition is formed.

The coating composition includes the solvent and the polymeric metal salt. As some of the solvent may evaporate during the reaction, the coating composition may be viscous enough for it to be coated on the metal substrate 12 or another sacrificial substrate.

In other examples, the polymeric metal salt is purchased (as opposed to being synthesized), and is dissolved or dispersed in a suitable solvent to form the coating composition. The solvent may be an organic solvent, such as N-methylpyrrolidone (NMP). The solvent may also be an aqueous medium (e.g., water or a mixture of water and a water-soluble solvent). In an example, a dispersion of NAFION® and water may be purchased. In this example, the dispersion may be neutralized with LiOH. This neutralized solution may be dried, and the dried substance (Li-NAFION®) may be dissolved (e.g., in NMP) to form the coating composition.

It is to be understood that the solvent selected for the coating composition is capable of dissolving the polymeric metal salt and does not react with the metal substrate 12.

In an example, the coating composition is coated on the surface of the metal substrate 12. Coating may be accomplished by any suitable technique, such as slot die coating, curtain coating, brushing, roller coating, spray coating, doctor blading, dip coating, or spin coating.

After application, the applied coating layer may be heated to help evaporate any water or organic solvent, to aid in film coalescence, or, in the case of a thermosetting polymer, to cure the coating layer to form the single-ion conductor coating 14. Any suitable heating temperature may be used, as long as the metal substrate 12 is stable at the heating temperature. Examples of suitable heating temperatures range from about 60° C. to about 300° C. Alternatively, after application, a vacuum may be applied to help evaporate any volatile compounds.

It is to be understood that as long as the coated coating composition can be dried to remove trace water (or other solvent), the coating composition may be applied to lithium or sodium. Zinc is stable in aqueous solutions, and thus the coated coating composition may or may not be dried when using zinc.

Coating the coating composition directly on the metal substrate 12 has several advantages, including the ability to achieve thinner films (e.g., when compared to free-standing membranes) and less manufacturing steps (e.g., no film formation and adhesion steps).

The polymeric single-ion conductor coating 14 on the surface of the metal substrate 12 may have a thickness ranging from about 10 nanometers to about 250 micrometers. In various examples, the single-ion conductor coating 14 has a thickness ranging from about 10 nanometers or from about 15 nanometers to about 1 micrometer or to about 0.5 micrometers. This thickness range is desirable because a polymeric single-ion conductor coating 14 that is too thick will have high resistance, and alternatively, a coating 14 that is too thin will not direct the current.

It is to be understood that the polymeric backbone chains may be cross-linked with one another. In one example, cross-linking is accomplished through the pendent metal salt groups.

In another example, the coating composition may be coated on a sacrificial material. Coating may be accomplished by any suitable technique, such as slot die coating, curtain coating, brushing, roller coating, spray coating, doctor blading, dip coating, or spin coating. After application, the applied coating layer may be heated or subjected to vacuum to help dry the coating 14 and to form a free-standing film on the sacrificial material. The free-standing film may be removed from the sacrificial material. The metal (of the desired metal substrate 12) may then be vacuum deposited on the free-standing film to form the metal substrate 12 with the polymeric single-ion conductor coating 14 thereon.

As depicted in FIG. 1, the polymeric single-ion conductor coating 14 has the metal cations (shown as $M^+$) substantially evenly distributed along the surface of the metal substrate 12. The polymeric single-ion conductor coating 14 has a comb-like structure, with the polymer backbone chain extending across the surface, and the pendent metal salt groups extending outward and away from the surface at predetermined positions (which depend upon the polymer backbone chain and the reaction between the polymer and the pendent metal salt groups). As previously described, this is due to the portions of the pendent metal salt groups, which carry the associated anions (shown as $\ominus$), being attached to particular atoms of the polymeric backbone.

The negative electrode 10 may be used in an electrochemical cell. Examples of the electrochemical cells 20, 20' are shown in FIGS. 2A and 2B.

Figure 2A:
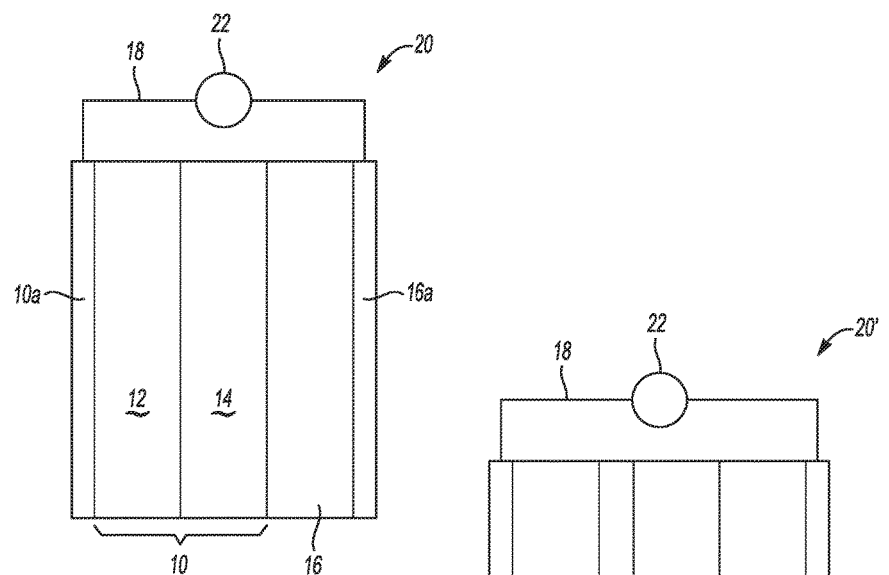
FIG. 2A is a schematic illustration of an example of an electrochemical cell disclosed herein.
Figure 2B:
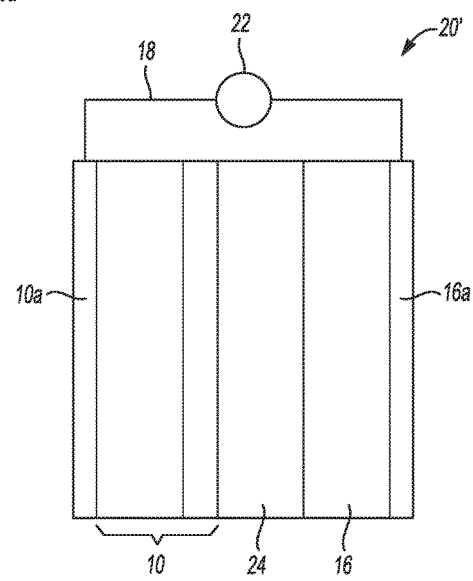
FIG. 2B is a schematic illustration of another example of an electrochemical cell disclosed herein.

In the example shown in FIG. 2A, the electrochemical cell 20 includes the negative electrode 10, a negative-side current collector 10a, a positive electrode 16, and a positive side current collector 16a.

The negative-side current collector 10a may be formed from copper or any other appropriate electrically conductive material. The positive-side current collector 16a may be formed from aluminum or any other appropriate electrically conductive material. The current collectors 10a, 16a that are selected should be capable of collecting and moving free electrons to and from an external circuit 18 connected thereto.

The positive electrode 16 includes an active material, alone or in combination with a binder and/or a conductive filler. The active material will depend, in part, on the type of the cell 20.

When the cell 20 is a lithium-ion cell, the positive electrode 16 active material may include a lithium-based active material. One common class of known lithium-based active materials suitable for the positive electrode 16 includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel ($Li(Ni_{0.5}Mn_{1.5})O_2$), a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese oxide spinel is $xLi_2MnO_3 \cdot (1-x)Li(Ni_{1/3}Mn_{1/3}Co_{1/3})O_2$. Other suitable lithium-based active materials include $Li(Ni_{1/3}Mn_{1/3}Co_{1/3})O_2$), $LiNiO_2$, $Li_{x+y}Mn_{2-y}O_4$ (LMO, 0<x<1 and 0<y<0.1), or a lithium ironpolyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of any ratio of Al, Co, and/or Mg), $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), and any other high efficiency nickel-manganese-cobalt material (HE-NMC, NMC or $LiNiMnCoO_2$). By "any ratio" it is meant that any element may be present in any amount. So, for example, M could be Al, with or without Co and/or Mg, or any other combination of the listed elements. In another example, anion substitutions may be made in the lattice of any example of the lithium transition metal based active material to stabilize the crystal structure. For example, any O atom may be substituted with an F atom.

When the cell 20 is a sodium-ion cell, the positive electrode 16 active material may include a sodium-based active material. Examples of suitable sodium-based active materials include sodium manganesehexacyanomanganate ($Na_2Mn[Mn(CN)_6]$), $NaVPO_4F$, $NaMnO_2$, $NaFePO_4$, and $Na_3V_2(PO_4)_3$).

When the cell 20 is a zinc-ion cell, the positive electrode 16 may be alpha manganese dioxide particles ($\gamma$-$MnO_2$), $ZnMn_2O_4$, and $ZnMnO_2$.

The active material in any examples of the positive electrode 16 may be intermingled with the previously mentioned binder and/or conductive filler. Suitable binders include polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, polyvinyl alcohol (PVA), sodium alginate, or other suitable binders. An example of the conductive filler is a high surface area carbon, such as acetylene black. The binder may hold the electrode materials together, and the conductive filler ensures electron conduction between the positive-side current collector 16a and the active material particles of the positive electrode 16.

In the example cell 20 shown in FIG. 2A, the polymeric single-ion conductor coating 14 of the negative electrode 10 is positioned between the metal substrate 12 and the positive electrode 16. In this example, in addition to substantially evenly distributing current across the metal substrate 12 and suppressing dendrite formation, the single-ion conductor coating 14 can also serve as the separator and electrolyte of the cell 20. The single-ion conductor coating 14 is capable of electrically insulating the metal substrate 12 from the positive electrode 16, and is also capable of serving as electrolyte for the cell 20, with or without the addition of extra solvent(s).

As shown in FIG. 2A, the cell 20 also includes the interruptible external circuit 18 that connects the negative electrode 10 and the positive electrode 16 (via the current collectors 10a, 16a). The cell 20 may also support a load device 22 that can be operatively connected to the external circuit 18. The load device 22 receives a feed of electrical energy from the electric current passing through the external circuit 18 when the cell 20 is discharging. While the load device 22 may be any number of known electrically-powered devices, a few specific examples of a power-consuming load device 22 include an electric motor for a hybrid vehicle or an all-electrical vehicle, a laptop computer, a cellular phone, and a cordless power tool. The load device 22 may also, however, be an electrical power-generating apparatus that charges the cell 20 for purposes of storing energy. For instance, the tendency of windmills and solar panels to variably and/or intermittently generate electricity often results in a need to store surplus energy for later use.

As mentioned above, the single-ion conductor coating 14 in the example shown in FIG. 2A is capable of serving as the solvating species for the ions in the cell 20, and thus can function as the cell electrolyte. Additional solvent or solvents may or may not be used in this example cell 20. When utilized, the additional solvent(s) may be added to soak at least the single-ion conductor coating 14. When lithium, sodium, or zinc is used as the metal substrate 12, the additional solvent(s) may be any solvent that increases Li, Na, or Zn metal cation mobility across the single-ion conductor coating 14, such as ethylene carbonate (EC), ethyl-methyl carbonate (EMC), diethyl carbonate (DEC), dimethyl ether (DME), tetraethylene glycol dimethyl ether (TEGDME), etc. When zinc is utilized as the metal substrate 12, water may also be used as the additional solvent. Since the salt is already present in the single-ion conductor coating 14, no additional salt is added when the additional solvent(s) are used.

FIG. 2B illustrates another example of the cell 20'. In the example shown in FIG. 2B, the electrochemical cell 20' includes the negative electrode 10, the negative-side current collector 10a, the positive electrode 16, the positive side current collector 16a, the interruptible external circuit 18, the load device 22, and a separator 24 separating the electrodes 10, 16.

The separator 24 in FIG. 2B operates as both an electrical insulator and a mechanical support, and is sandwiched between the single-ion conductor coating 14 of the negative electrode 10 and the positive electrode 16 to prevent physical contact between the two electrodes 10, 16 and the occurrence of a short circuit. In addition to providing a physical barrier between the two electrodes 10, 16, the separator 24 ensures passage of lithium, sodium, or zinc ions and related anions through an electrolyte solution filling its pores. This helps ensure that the cell 20' functions properly.

The separator 24 is porous and may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the separator 24 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the separator 24 may be chosen from a combination of the polyolefin (such as PE and/or PP) and one or more of the polymers listed above.

The separator 24 may contain a single layer or a multi-layer laminate fabricated from either a dry or wet process. For example, a single layer of the polyolefin and/or other listed polymer may constitute the entirety of the separator 24. As another example, however, multiple discrete layers of similar or dissimilar polyolefins and/or polymers may be assembled into the separator 24. In one example, a discrete layer of one or more of the polymers may be coated on a discrete layer of the polyolefin to form the separator 24. Further, the polyolefin (and/or other polymer) layer, and any other optional polymer layers, may further be included in the separator 24 as a fibrous layer to help provide the porous separator 24 with appropriate structural and porosity characteristics. Still other suitable separators 24 include those that have a ceramic layer attached thereto, and those that have ceramic filler in the polymer matrix (i.e., an organic-inorganic composite matrix).

As mentioned above, this example cell 20' has an electrolyte filling the pores of the separator 24.

For the lithium-based cell 20', any appropriate electrolyte solution that can conduct lithium ions between the negative electrode 10 and the positive electrode 16 may be used. In one example, the electrolyte solution may be a non-aqueous liquid electrolyte solution that includes a lithium salt dissolved in an organic solvent or a mixture of organic solvents. Examples of lithium salts that may be dissolved in the organic solvent to form the non-aqueous liquid electrolyte solution include $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, LiB $(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiPF_4(C_2O_4)$ (LiFOP), $LiNO_3$, $LiPF_3(C_2F_5)_3$ (LiFAP), $LiPF_4(CF_3)_2$, $LiPF_3(CF_3)_3$, and mixtures thereof. These and other similar lithium salts may be dissolved in a variety of organic solvents, such as cyclic carbonates (ethylene carbonate (EC), propylene carbonate (PC), butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran,1,3-dioxolane), and mixtures thereof.

For the sodium-based cell 20', any appropriate electrolyte solution that can conduct sodium ions between the negative electrode 10 and the positive electrode 16 may be used. In one example, the electrolyte solution may be $NaPF_6$ dissolved into the EC and DEC.

For the zinc-based cell 20', any appropriate electrolyte solution that can conduct zinc ions between the negative electrode 10 and the positive electrode 16 may be used. In one example, the electrolyte solution may be $ZnSO_4$ dissolved into $H_2O$.

The cells 20, 20' disclosed herein may also include a wide range of other components that, while not depicted here, are nonetheless known to skilled artisans. For instance, the cells 20, 20' may include a casing, gaskets, terminals, tabs, and any other desirable components or materials that may be situated between or around the negative electrode 10 and the positive electrode 16 for performance-related or other practical purposes. Moreover, the size and shape of the cell 20, 20', as well as the design and chemical make-up of its main components, may vary depending on the particular application for which it is designed. Battery-powered automobiles and hand-held consumer electronic devices, for example, are two instances where the cell 20, 20' would most likely be designed to different size, capacity, and power-output specifications. The cell 20, 20' may also be connected in series and/or in parallel with other similar cells 20, 20' to produce a greater voltage output and current (if arranged in parallel) or voltage (if arranged in series) if the load device 22 so requires.

To further illustrate the present disclosure, an example is given herein. It is to be understood that this example is provided for illustrative purposes and is not to be construed as limiting the scope of the present disclosure.

EXAMPLE

Two examples of the polymeric single-ion conductor were prepared. One example was a metal salt of a sulfonated tetrafluoroethylene-based fluoropolymer copolymer and the other example was a polymeric metal salt having a polysulfone backbone and lithium malonatodifluoroborate salt groups attached to the polysulfone backbone. Both examples were prepared according to the methods disclosed herein. For the metal salt of the sulfonated tetrafluoroethylene-based fluoropolymer copolymer, NAFION® was purchased and reacted with LiOH as shown in second half of scheme 1. The lithium malonatodifluoroborate salt was attached to the polysulfone backbone. The synthesis of polysulfone with pendant double bonds can be found in the publication ECS Transactions, 33 (1) 683-691 (2010). Synthesis of the allyl lithium malonatodifluoroborate salt included:

Step I. Diethyl 2-allyl,2-fluoro malonate was synthesized by reacting diethyl fluoro malonate, allyl bromine and potassium carbonate in anhydrous acetonitrile with molar ratio 1:1.5:3 at 70° C. for 48 hours. The raw products of the formed malonate were fraction distilled with purity >99%.

Step II. Lithium 2-allyl,2-F malonates were synthesized by hydrolysing diethyl 2-allyl,2-F malonates with lithium hydroxide in $H_2O$ at 70° C. for 24 hours followed by rinsing with large amount methanol to remove the residue LiOH and vacuum drying at 120° C.

Step III. Di(trichloromethylsilyl) 2-allyl, 2-F malonates were synthesized by reacting Lithium 2-allyl,2-F malonates with chlorotrimethylsilane with molar ratio 1:2.5 in 1,2-dichloroethane at 70° C. for 3 days. The di(trichloromethylsilyl) 2-allyl, 2-F malonates were purified by first vacuum removing the 1,2-dichloroethane, followed by fraction distillation at 73-74° C./0.25 T.

Step IV. Lithium 2-allyl,2-F malonatodifluoroborates were synthesized by adding di(trichloromethylsilyl) 2-allyl, 2-F malonates into $LiBF_4$-acetonitrile dropwise, with molar ratio 1:1 at ~40° C. The final lithium 2-allyl,2-F malonatodifluoroborates were vacuum dried to remove residue acetonitrile, followed by rinsing with anhydrous toluene and 1,2-dichloroethane and vacuum drying again.

The allyl Lithium salt was attached to the polysulfone by mixing equal amounts of the salt and polymer in THF, in the presence of a polymerizing initiator, such as azobisisobutyronitile (AIBN) or benzoyl peroxide (BPO), or in the presence of a Pt related catalyst.

Figure 3:
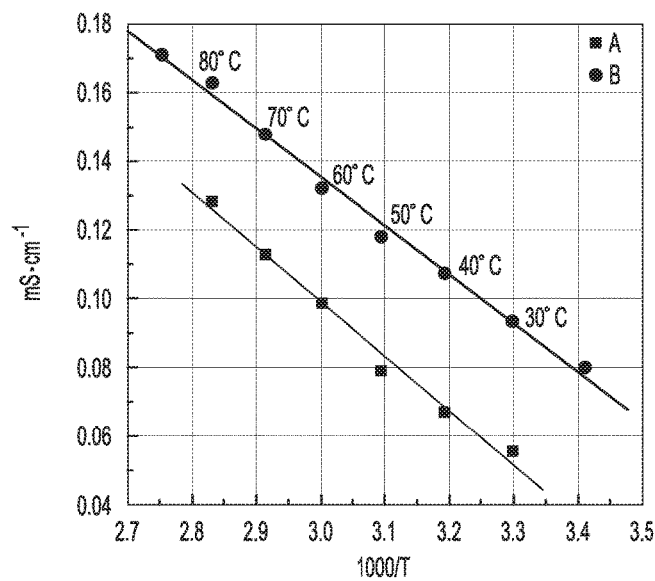
FIG. 3 is a graph depicting the specific conductivity (in terms of mS·cm$^{-1}$) versus 1000/T (K$^{-1}$) for two example polymeric single-ion conductors.

The respective coating compositions were coated on respective lithium foils to form SIC coated negative electrodes either by direct coating or by film attaching after the coating composition was applied to a sacrificial material and dried to form the self-standing film. The negative electrodes were paired with lithium foil counter electrodes in coin cells, and soaked in a solution of ethylene carbonate:diethyl carbonate (EC:DEC, 1:2). The specific conductivity ($mS \cdot cm^{-1}$) was measured for each of the cells (A, including the lithium salt of NAFION®, and B, including the polymeric lithium salt) and the results are shown in FIG. 3 as a function of inverse or reciprocal temperature (1000/T). The results indicate that both single-ion conductors exhibit suitable conductivity at relative high temperature, and that the polymeric metal salt having a polysulfone backbone and lithium malonatodifluoroborate lithium salt groups (B) had higher conductivity than the metal salt of a sulfonated tetrafluoroethylene-based fluoropolymer copolymer (A).

The polymeric metal salt SIC coated negative electrode was paired with a lithium foil counter electrode in a coin cell, and soaked in an solution of ethylene carbonate:diethyl carbonate (EC:DEC, 1:2).

Figure 4:
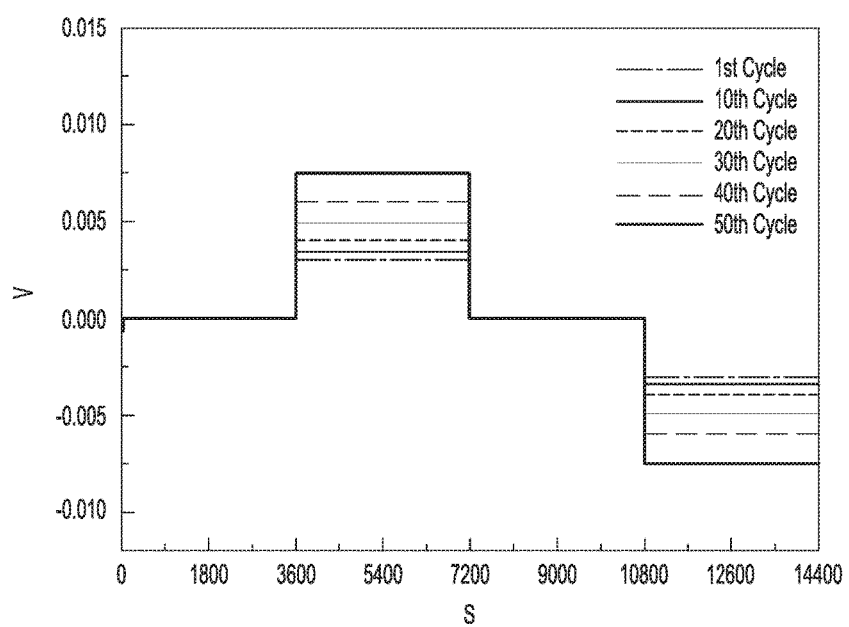
FIG. 4 is a graph depicting the cycling performance (in terms of voltage (V) versus time in seconds (s)) of an electrochemical cell including lithium electrodes and a polymeric single-ion conductor coating formed on a surface of one of the lithium electrodes.

The coin cell was cycled continuously with ±100 uA for every hour and rest 1 hour in between. The cycling performance, in terms of voltage (V) versus time in seconds (s) is shown in FIG. 4. The results in FIG. 4 indicate that there was no lithium dendrite formation after 50 cycles. This conclusion can be drawn because there was no sudden drop in voltage.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 10 nanometers to about 250 micrometers should be interpreted to include not only the explicitly recited limits of about 10 nanometers to about 250 micrometers, but also to include individual values, such as 150 nanometers, 225 nanometers (0.225 micrometers), 10 micrometers, etc., and sub-ranges, such as from about 100 nanometers to about 13 micrometers, from about 1 micrometer to about 5 micrometers, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:
1. A negative electrode, consisting essentially of:
a metal substrate selected from the group consisting of lithium, sodium, and zinc; and
a polymeric single-ion conductor coating formed on a surface of the metal substrate, the polymeric single-ion conductor coating formed of a polymeric metal salt having a polymeric backbone and pendent metal salt groups attached to the polymeric backbone,
wherein the polymeric backbone is selected from the group consisting of polyolefin, polyvinylidene fluoride, polyethylene oxide, polyimide, and co-polymers thereof, and the pendent metal salt groups are attached directly to one of the polyolefin, polyvinylidene fluoride, polyethylene oxide, and polyimide, and
wherein the polymeric single-ion conductor coating has a comb-like structure where the polymeric backbone extends across the surface and the pendent metal salt groups are attached to the polymeric backbone so as to extend outward and away from the surface at a predetermined position.

2. The negative electrode as defined in claim 1 wherein the polymeric backbone is cross-linked.

3. The negative electrode as defined in claim 1 wherein the polymeric backbone is not cross-linked.

4. The negative electrode as defined in claim 1 wherein the pendent metal salt is one of:
a lithium salt selected from the group consisting of lithium bis(trifluoromethane)sulfonimide, lithium malonatodifluoroborate, lithium sulfonate, lithium triflate, analogs thereof, and combinations thereof; or
a sodium salt selected from the group consisting of sodium trifluoromethanesulfonate, $NaClO_4$, $NaPF_6$, $NaBF_4$, NaTFSI (sodium(I) Bis(trifluoromethanesulfonyl)imide), NaFSI (sodium(I) Bis(fluorosulfonyl)imide), analogs thereof, and combinations thereof; or
a zinc salt selected from the group consisting of zinc trifluoromethanesulfonate, $Zn(ClO_4)_2$, $Zn(PF_6)_2$, $Zn(BF_4)_2$, $Zn(TFSI)_2$ (zinc(II) Bis(trifluoromethanesulfonyl)imide), $Zn(FSI)_2$ (zinc(II) Bis(fluorosulfonyl)imide), analogs thereof, and combinations thereof.

5. The negative electrode as defined in claim 1 wherein the metal substrate is selected from the group consisting of lithium foil, sodium foil, and zinc foil.

6. The negative electrode as defined in claim 1 wherein the pendent metal salt groups are substantially evenly distributed along the surface of the metal substrate.

7. The negative electrode as defined in claim 1 wherein the pendent metal salt is one of: lithium malonatodifluoroborate, $NaClO_4$, $NaPF_6$, $NaBF_4$, NaFSI (sodium(I) bis(fluorosulfonyl)imide), zinc trifluoromethanesulfonate, $Zn(ClO_4)_2$, $Zn(PF_6)_2$, $Zn(BF_4)_2$, $Zn(FSI)_2$(zinc(II) bis(fluorosulfonyl)imide), and combinations thereof.

8. An electrochemical cell, comprising:
a positive electrode; and
a negative electrode consisting essentially of:
a metal substrate selected from the group consisting of lithium, sodium, and zinc; and
a polymeric single-ion conductor coating formed on a surface of the metal substrate, the polymeric single-ion conductor coating formed of a polymeric metal salt having a polymeric backbone and pendent metal salt groups attached to the polymeric backbone;
wherein the polymeric single-ion conductor coating faces the positive electrode and the polymeric backbone is selected from the group consisting of polyolefin, polyvinylidene fluoride, polyethylene oxide, polyimide, and co-polymers thereof, and the pendent metal salt groups are attached directly to one of the polyolefin, polyvinylidene fluoride, polyethylene oxide, and polyimide, and
wherein the polymeric single-ion conductor coating has a comb-like structure where the polymeric backbone extends across the surface and the pendent metal salt groups are attached to the polymeric backbone so as to extend outward and away from the surface at a predetermined position.

9. The electrochemical cell as defined in claim 8 wherein the pendent metal salt is one of:
a lithium salt selected from the group consisting of lithium bis(trifluoromethane)sulfonimide, lithium malonatodifluoroborate, lithium sulfonate, lithium triflate, analogs thereof, and combinations thereof; or
a sodium salt selected from the group consisting of sodium trifluoromethanesulfonate, $NaClO_4$, $NaPF_6$, $NaBF_4$, NaTFSI (sodium(I) Bis(trifluoromethanesulfonyl)imide), NaFSI (sodium(I) Bis(fluorosulfonyl)imide), analogs thereof, and combinations thereof; or
a zinc salt selected from the group consisting of zinc trifluoromethanesulfonate, $Zn(ClO_4)_2$, $Zn(PF_6)_2$, $Zn(BF_4)_2$, $Zn(TFSI)_2$ (zinc(II) Bis(trifluoromethanesulfonyl)imide), $Zn(FSI)_2$ (zinc(II) Bis(fluorosulfonyl)imide), analogs thereof, and combinations thereof.

10. The electrochemical cell as defined in claim 8 wherein the polymeric single-ion conductor coating further includes a solvent to increase metal cation mobility.

11. The electrochemical cell as defined in claim 8, further comprising a separator positioned between the positive electrode and the polymeric single-ion conductor coating of the negative electrode.

12. The electrochemical cell as defined in claim 8 wherein the pendent metal salt groups are substantially evenly distributed along the surface of the metal substrate.

13. The electrochemical cell as defined in claim 8 wherein the pendent metal salt is one of: lithium malonatodifluoroborate, $NaClO_4$, $NaPF_6$, $NaBF_4$, NaFSI (sodium(I) bis(fluorosulfonyl)imide), zinc trifluoromethanesulfonate, $Zn(ClO_4)_2$, $Zn(PF_6)_2$, $Zn(BF_4)_2$, $Zn(FSI)_2$(zinc(II) bis(fluorosulfonyl)imide), and combinations thereof.

14. A method for obtaining a homogeneous distribution of metal ions across a surface of a metal substrate, the method comprising:
   selecting the metal substrate from the group consisting of lithium, sodium, and zinc; and
   forming a polymeric single-ion conductor coating on the surface of the metal substrate, the polymeric single-ion conductor coating formed of i) a metal salt of a sulfonated tetrafluoroethylene-based fluoropolymer copolymer or ii) a polymeric metal salt having a polymeric backbone and pendent metal salt groups attached to the polymeric backbone, wherein the polymeric backbone is selected from the group consisting of polyolefin, polyvinylidene fluoride, polysulfone, polyethylene oxide, polyacrylate, polysiloxane, poly(vinyl acetate), polyimide, and co-polymers thereof and the pendent metal salt groups are attached directly to one of the polyolefin, polyvinylidene fluoride, polyethylene oxide, polysulfone and polyimide
   wherein forming the polymeric single-ion conductor coating on the surface of the metal substrate includes:
      forming a coating composition including a solvent and one of the metal salt of sulfonate tetrafluoroethylene-based fluoropolymer copolymer or the polymeric metal salt dissolved or dispersed in the solvent;
      coating the coating composition on a sacrificial material;
      drying the coating to form a free-standing film;
      removing the sacrificial material from the free-standing film; and
      vacuum depositing the metal substrate on the free-standing film.

15. The method as defined in claim 14 wherein:
   the pendent metal salt is one of:
      a lithium salt selected from the group consisting of lithium bis(trifluoromethane)sulfonimide, lithium malonatodifluoroborate, lithium sulfonate, lithium triflate, analogs thereof, and combinations thereof; or
      a sodium salt selected from the group consisting of sodium trifluoromethanesulfonate, $NaClO_4$, $NaPF_6$, $NaBF_4$, NaTFSI (sodium(I) Bis(trifluoromethanesulfonyl)imide), NaFSI (sodium(I) Bis(fluorosulfonyl)imide), analogs thereof, and combinations thereof; or
      a zinc salt selected from the group consisting of zinc trifluoromethanesulfonate, $Zn(ClO_4)_2$, $Zn(PF_6)_2$, $Zn(BF_4)_2$, $Zn(TFSI)_2$ (zinc(II) Bis(trifluoromethanesulfonyl)imide), $Zn(FSI)_2$ (zinc(II) Bis(fluorosulfonyl)imide), analogs thereof, and combinations thereof.

16. The method as defined in claim 15, further comprising forming the polymeric metal salt by tethering the pendent metal salt groups to the polymeric backbone.

17. The method as defined in claim 14 wherein the metal salt of a sulfonated tetrafluoroethylene-based fluoropolymer copolymer and the pendent metal salt group are substantially evenly distributed along the surface of the metal substrate.

18. The method as defined in claim 14, wherein the pendent metal salt is one of: lithium malonatodifluoroborate, $NaClO_4$, $NaPF_6$, $NaBF_4$, NaFSI (sodium(I) bis(fluorosulfonyl)imide), zinc trifluoromethanesulfonate, $Zn(ClO_4)_2$, $Zn(PF_6)_2$, $Zn(BF_4)_2$, $Zn(FSI)_2$(zinc(II) bis(fluorosulfonyl)imide), and combinations thereof.

* * * * *